United States Patent Office 2,970,572
Patented Feb. 7, 1961

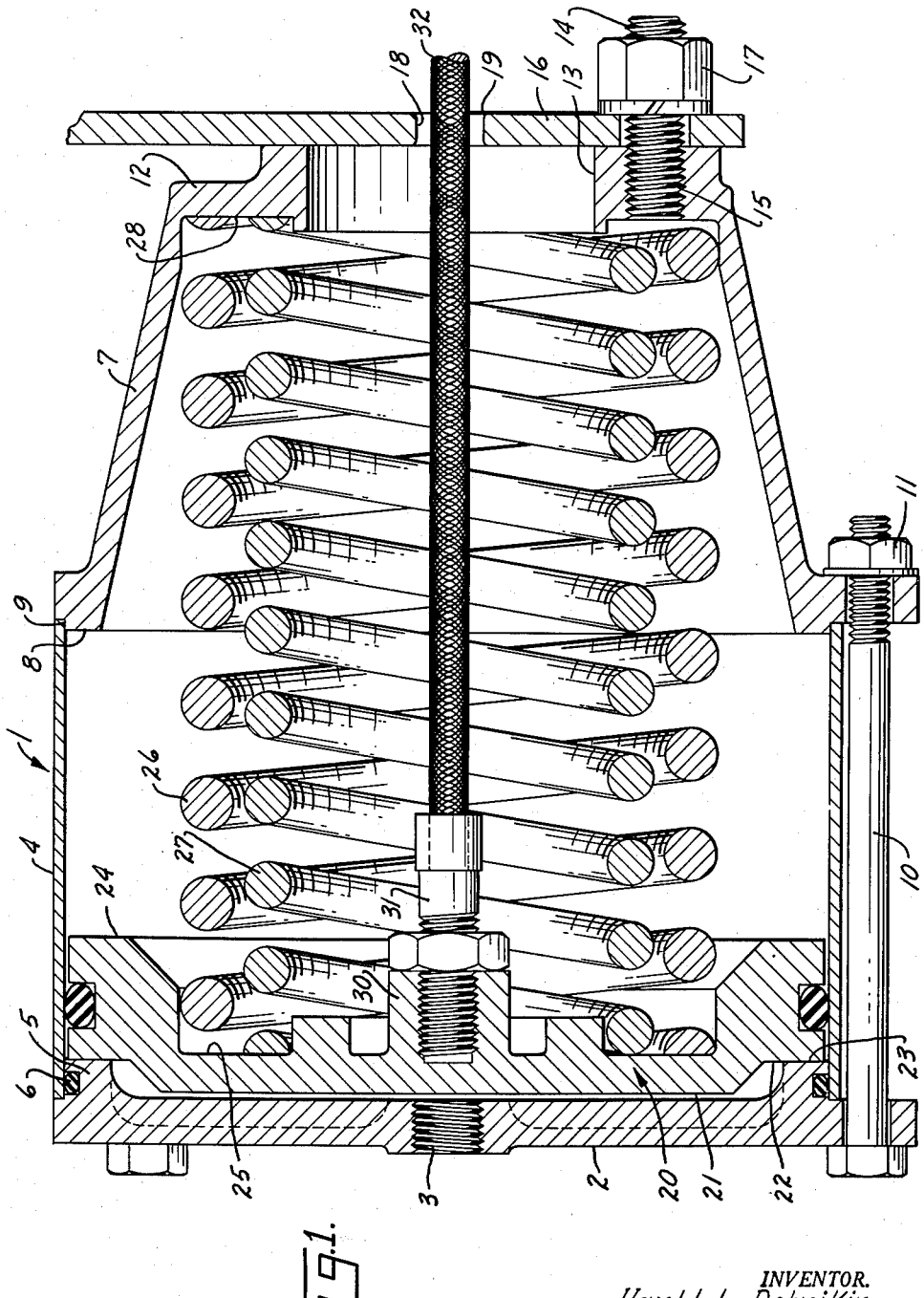

2,970,572
PARKING BRAKE CHAMBER

Harold L. Dobrikin, Highland Park, and Victor Mastis, Chicago, Ill., assignors to Berg Airlectro Products Co., Chicago, Ill., a corporation of Illinois Filed Oct. 17, 1958, Ser. No. 767,994

2 Claims. (Cl. 121—38)

This invention relates to cylinder and piston arrangements and particularly to a parking brake chamber comprising a cylinder, a piston movable therein and a means for transmitting the motion of said piston.

One purpose of the invention is to provide a means for transmitting motion of said piston which enables the chamber encompassing said piston to be placed at a variety of locations.

Particularly in relation to its employment in vehicles, specifically trucks and trailer trucks, the location and positioning of such a parking brake chamber has in the past raised substantial difficulties. Since the connection of the piston to other elements on the truck has been universally constituted by a rigid member, normally a rod, various mechanisms have been required in order to direct the transmission of force or motion of the piston to the desired point on the truck. This has further complicated the positioning and location of the parking brake chamber and has required the employment of uneconomical elements.

Accordingly, it is one purpose of the present invention to provide a flexible means for transmitting the motion of the piston in a parking chamber.

Other purposes will appear from time to time during the course of the specification and claims.

We illustrate our invention more or less diagrammatically in the accompanying drawing wherein:

Figure 1 is a side elevation in partial cross section and illustrating our invention;

Like parts are indicated by like numerals throughout the specification and drawing.

Referring now to the drawing, the numeral 1 generally indicates a housing. The housing 1 may be comprised of a forward wall 2 carrying a centrally positioned inlet aperture 3 which may be threaded, for example, to permit the attachment of a suitable source of fluid pressure supply. A cylindrical wall 4 may have one of its open ends held in abutting relationship against and surrounding an inwardly directed flange 5 on the wall 2, the wall 4 and the flange 5 being sealed by any suitable sealing means, such as the ring 6. Illustrated at 7 is a rear housing element having an inwardly directed flange 8 held in abutting relationship against and within the opposite open end of the wall 4, as illustrated at 9. Clamping means, such as the bolt 10 and nut 11 extend between the housing portions 2 and 7 to clamp the wall 4 therebetween. The portion 7 has an inwardly directed annular flange 12 defining a comparatively large aperture 13. Suitable connecting means, such as the stud 14, may be threadedly engaged with portions of the flange 12, as indicated at 15 and may extend through the wall of an attaching wall portion 16 to be secured by the nut 17 on the opposite side of the wall 16 and thus to hold the housing or chamber 1 in position. The wall 16 may have an aperture 18 with rounded edges, such as those indicated at 19.

A piston 20 has one flat outer surface 21 opposed to the inlet 3. The surface 21 may have an annular recess, as indicated at 22, to provide a ledge or perimetrical surface positioned to engage the inwardly directed surface 23 of flange 5 on wall portion 2.

The opposite surface 24 of the piston 20 has formed therein an annular groove 25 in which seat a pair of springs 26, 27. The spring 26 is of substantially larger size than the spring 27 and surrounds the latter. Both springs 26 and 27 extend longitudinally through the housing or chamber 1 and have their opposite ends seated upon or bearing against an inner face 28 of the flange portion 12.

A centrally positioned well 30 on the inner wall 24 of piston 20 receives a fitting 31. A flexible cable 32 is secured to the fitting 31 and extends longitudinally, axially through the housing 1 and the springs 26, 27, the aperture 13 and the aperture 18. It will be understood that the opposite end of the flexible cable 32 is secured to the element to which the motion of the piston 20 is desired to be transmitted. Since the cable 32 is flexible, it may be wound about any desirable mechanism, such as pulleys and the like, to be brought to the desired point of application of the motion of piston 20 produced by springs 26, 27. Thus the chamber 1 may be positioned at almost any desirable point on the truck or vehicle or other device to which the chamber is applicable, without the necessity for considering the difficulties raised by the employment of a rigid rod for the purpose of transmitting the motion or force of piston 20.

Although an operative form of the device has been shown, the invention is not limited to the particular details shown. Many changes may be made in the form, shape and arrangement of parts without departing from the spirit of the invention. For example, whereas there is shown a substantially reduced aperture 18 in the wall member 16, it will be realized that the aperture 18 could be of a variety of sizes, dependent upon the positioning and direction of the cable 32 beyond the chamber 1.

We claim:

1. A parking brake chamber comprising a housing, a fluid pressure inlet at one end of said housing, a piston reciprocal within said housing between said fluid pressure inlet and the opposite end of said housing, a pair of coiled springs, of differential strength, axially disposed in said housing and having their opposite ends in engagement with said piston and said opposite end of said housing, and a flexible cable secured to said piston on its side opposite from that opposed to said inlet and extending through said opposite end of said housing.

2. A housing, a pressure inlet at one end of said housing, a piston reciprocal in said housing between said inlet and the opposite end of said housing, a pair of coil springs of differential pressure disposed axially of said housing and having their opposite ends in engagement with the surface of said piston opposite that opposed to said inlet and with an inner surface of said opposite end of said housing, an aperture in said opposite end of said housing and motion-transmitting means secured to said piston and extending through said aperture, said motion-transmitting means comprising a flexible cable secured to said piston and extending co-axially with said housing, coil springs and aperture from said piston through said aperture.

References Cited in the file of this patent

UNITED STATES PATENTS

| 364,646 | Hanson | June 14, 1887 |
| 1,756,910 | Fuller | Apr. 29, 1930 |
| 2,352,334 | Macomber | June 27, 1944 |
| 2,875,734 | Winters | Mar. 3, 1959 |
| 2,913,919 | Malkiewicz | Nov. 24, 1959 |

FOREIGN PATENTS

| 1,120,334 | France | Apr. 16, 1956 |